(12) United States Patent
Li et al.

(10) Patent No.: US 7,480,768 B2
(45) Date of Patent: Jan. 20, 2009

(54) APPARATUS, SYSTEMS AND METHODS TO REDUCE ACCESS TO SHARED DATA STORAGE

(75) Inventors: Xiao-Feng Li, Beijing (CN); Haibo (Jason) Lin, Beijing (CN); Dz-ching (Roy) Ju, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 11/241,249

(22) Filed: Sep. 30, 2005

(65) Prior Publication Data

US 2007/0079079 A1 Apr. 5, 2007

(51) Int. Cl.
*G06F 12/00* (2006.01)

(52) U.S. Cl. .................................................. 711/137
(58) Field of Classification Search ........................ None
See application file for complete search history.

(56) References Cited

U.S. PATENT DOCUMENTS 6,269,425 B1 * 7/2001 Mounes-Toussi et al. ... 711/133

2004/0230748 A1 * 11/2004 Ohba .......................... 711/137

OTHER PUBLICATIONS

"Introduction to the Auto-Partitioning Programming Model", *Intel in Communications/White Paper*, (Oct. 2003),1-10.
Chen, Michael K., et al., "Shangri-La: Achieving High Performance from Compiled Network Applications while enabling Ease of Programming", Formal publication of inventors' research.
Goglin, Stephen D., et al., "Advanced Software Framework, Tools, and Languages for IXP Family", *Intel Technology Journal*, vol. 7, Issue 4, (Nov. 14, 2003),64-77.
Liu, Tao, et al., "Optimizing Packet Accesses for a Domain Specific Language on Network Processors", *Institute of Computing Technology, Chinese Academy of Sciences*, Graduate School of Chinese Academy of Sciences to be presented at LCPC in Oct. 2005.

* cited by examiner

*Primary Examiner*—Hiep T Nguyen
(74) *Attorney, Agent, or Firm*—Schwegman, Lundberg & Woessner, P.A.

(57) ABSTRACT

There is provided a method and apparatus to reduce access to shared data storage. The apparatus analyzes a multithreaded application and generates metadata that is utilized to optimize the multithreaded application that executes on multiple processing elements.

20 Claims, 10 Drawing Sheets

US 7,480,768 B2

APPARATUS, SYSTEMS AND METHODS TO REDUCE ACCESS TO SHARED DATA STORAGE

TECHNICAL FIELD

Various embodiments described herein relate to data processing generally, including apparatus, systems, and methods to reduce access to shared data storage from an application that executes on multiple processing elements.

BACKGROUND

Shared memory multiprocessors, chip multiprocessors, multicore processors, etc. provide for multiple processing elements, where each processing element may execute, in parallel, one or more subtask(s) from a single multithreaded application. These types of processors are generally well suited for network applications. For instance the chip multiprocessor may execute a network application that processes data associated with packets that pass through multiple subtasks across the multiple processors on the chip multiprocessor. Data may be generated by one subtask in the multithreaded application and accessed by the same or different subtasks in the multithreaded application.

DETAILED DESCRIPTION

Figure 1:
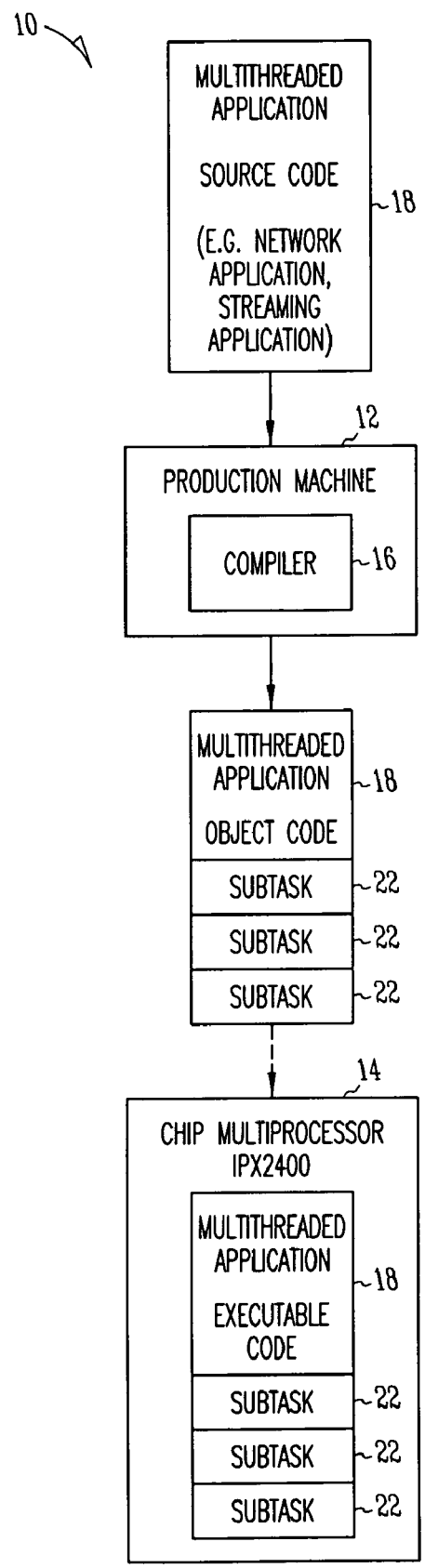
FIG. 1 is a block diagram depicting a system, according to an embodiment.

FIG. 1 is a block diagram depicting a system 10, according to an embodiment. The system 10 is shown to include a production machine 12 and a chip multiprocessor 14. The production machine 12 may be utilized to execute a compiler 16 that compiles a multithreaded application 18 in the form of source code to generate corresponding object code. The object code is subsequently utilized to generate the multithreaded application 18 in the form of executable code that is executed on the chip multiprocessor 14.

The chip multiprocessor 12 is an example of a device that utilizes multiple processing elements where each processing element may access shared data storage and execute, in parallel, one or more subtask(s) from a single multithreaded application. Other such devices may include a multiprocessor or a multicore processor. The multicore processor may provide two or more execution units or processing elements (e.g. cores) in a single processor.

The multithreaded application 18 includes multiple subtasks 22 that may simultaneously be executed by different or the same processor on the chip multiprocessor 14. The multithreaded application 18 may share data between the subtasks 22 when programmed for the chip multiprocessor 14. The data sharing may be achieved in different ways but may frequently be done through shared memory (not shown). In an embodiment the multithreaded application 18 may include a network application that processes data associated with packets that pass through multiple tasks across the multiple processors 38 (in FIG. 2) on the chip multiprocessor 14. The data are generated by one packet processing function (e.g., subtask 22) and accessed by the same or different functions (e.g., subtasks 22) in the multithreaded application 18 (e.g., data plane networking application). The subtasks 22 may store the data in shared data storage (not shown). The shared data storage is global so that the subtasks 22 can share the data when the subtasks are mapped to different threads for execution on one of the processors in the chip multiprocessor 14. In another embodiment the multithreaded application 18 may include a streaming application that processes data as a continuous stream. In such applications a client browser, plug-in or other application may begin displaying data before an entire file is transferred to the machine on which the application is processing. In general, the multithreaded application 18 is embodied as an application that is comprised of subtasks 22 that share data and may be executed in parallel by the multiple processors on the chip multiprocessor 14.

Figure 2:
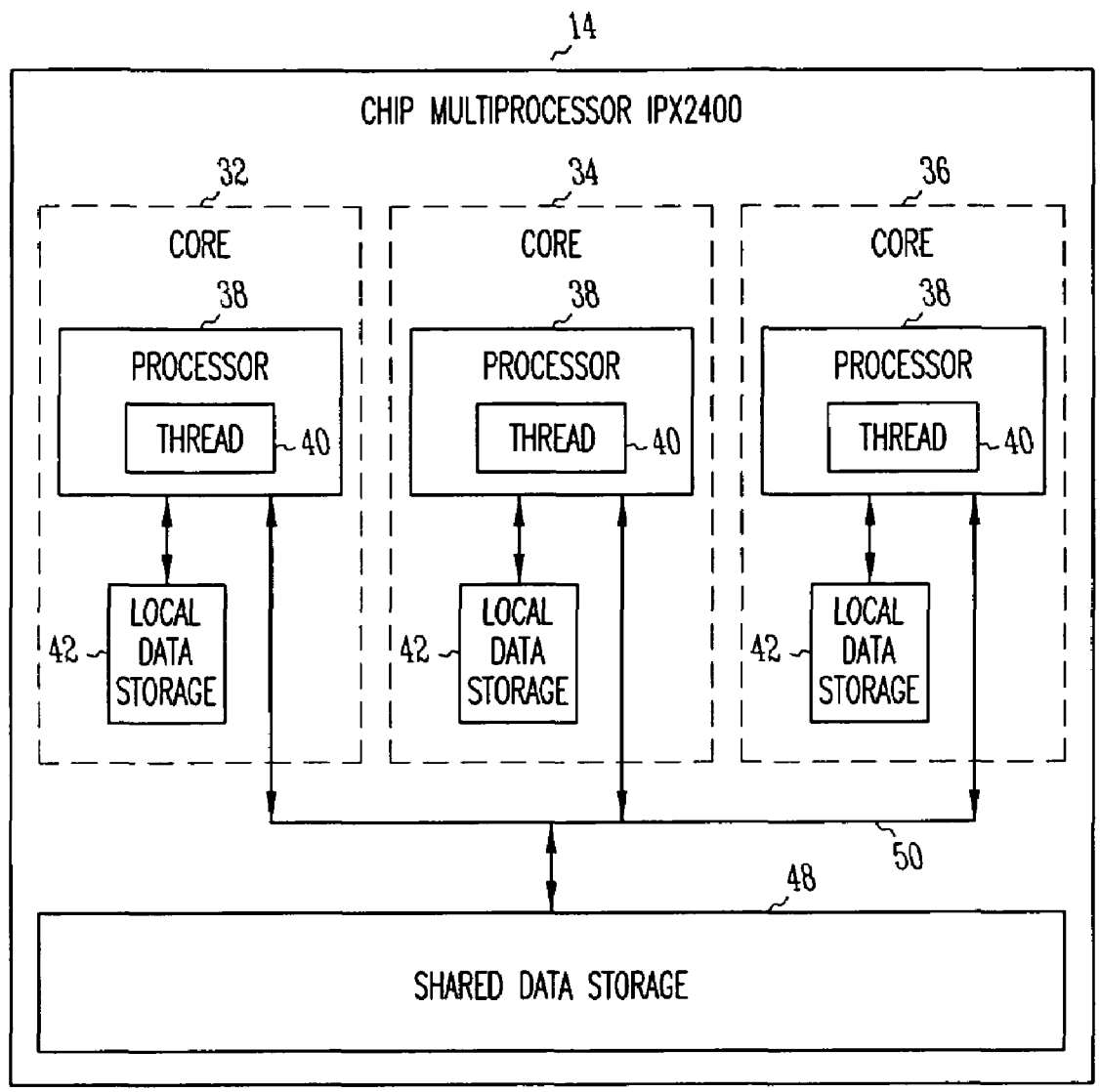
FIG. 2 is a block diagram illustrating a chip multiprocessor, according to an embodiment.

FIG. 2 is a block diagram illustrating a chip multiprocessor 14, according to an embodiment. The chip multiprocessor 14 is shown to include multiple cores 32, 34, 36 or microengines that host threads 40 that may execute to access a local data storage 42 and, over a bus 50, a shared data storage 48. The chip multiprocessor 14 may be embodied as Intel IPX2400, XP28000 and IPX2850 network processors developed by Intel of Santa Clara, Calif.

The chip multiprocessor 14 does not provide for automatic hardware caching of data as found in other types of processors. For example, other types of processors may improve processing performance by moving the data between various memory elements (e.g., shared data storage 48, local data storage 42). The chip multiprocessor 14 therefore relies on the software that executes on the processors 38 to move the data to storage locations to optimize performance.

The local data storage 42 requires a shorter latency compared to the shared data storage 48 and is private to the respective threads 40 executing in respective the cores 32, 34, 36. For example, the thread 40 executing in the core 32 is limited to accessing the local data storage 42 in the core 32 and may not access the local data storage 44 in the cores 34 or 36. It will be appreciated by those in the art that the local data storage 42 may be embodied as memory, a register, or any storage mechanism that is private to a processing element.

The shared data storage 48 requires a longer latency compared to the local data storage 42. For example, in one embodiment the chip multiprocessor 14 may require eighty machine cycles to access the shared data storage 48 and three machine cycles to access the local data storage 42. In addition, access to the shared data storage 48 may also be limited or slowed by bandwidth limitations of the bus 50.

The chip multiprocessor 12 may facilitate the sharing of data between subtasks 22 by providing the shared data storage 48 that may be accessed by each processor 38. Latency, as mentioned above, may be a problem. For example, access to the shared data storage may require a greater number of machine cycles than access to local data storage 42. The problem may be alleviated by an assembly language programmer that is familiar with the architecture of the chip multiprocessor 14 and may produce assembly code that takes advantage of the shorter latency provided by the local data storage 32 while also utilizing the shared data storage 48 to provide for the sharing of data between the subtasks. This approach, however, is not without problems. First, coding assembly language software to manage data storage may be tedious and error prone. Second, assembly language programs may execute only on the hardware for which they are designed and therefore must be modified before being ported to new hardware.

With regard to the above described memory hierarchy, it will be appreciated by one having ordinary skill in the art that it may be embodied differently. In an embodiment the memory hierarchy, progressing from the shortest to the longest latency, may include registers, local memory, scratch pad memory, static ram (SRAM), and dynamic ram (DRAM), the registers and the local memory being exclusively accessed from within a particular processing element.

Figure 3:
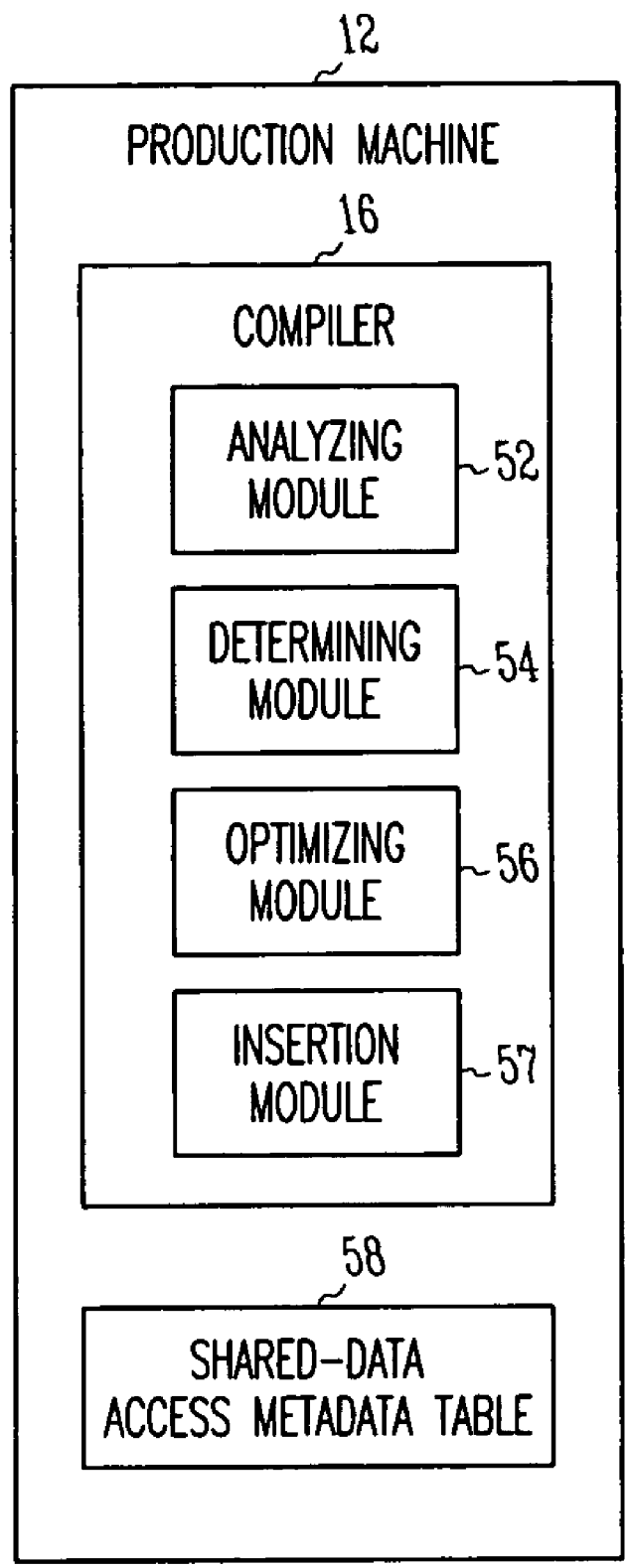
FIG. 3 is a block diagram illustrating a production machine and a compiler, according to an embodiment.

FIG. 3 is a block diagram illustrating a production machine 12 and an apparatus or system in the form of a compiler 16, according to an embodiment. The production machine 12 may include any machine suitable for executing the compiler 16. The production machine 12 is shown to store a shared-data access metadata table 58. The shared-data access metadata table 58 may be utilized by the compiler 16 to store metadata associated with the multithreaded application 18 during compilation of the multithreaded application 18.

The compiler 16 may be utilized to compile the multithreaded application 18 into object code for execution on the chip multiprocessor 14 and to optimize the multithreaded application 18. The compiler 16 may optimize the multithreaded application 18 by reducing access to shared storage area from the multithreaded application 18. Further, it will be appreciated by one having ordinary skill in the art that a particular compiler 16 may be selected to generate object code that is compatible with particular type of chip multiprocessor 14 (e.g., versions, manufacturers, etc.). The compiler 16 has an analyzing module 52, a determining module 54, an optimizing module 56, and an insertion module 57. The compiler 16 may further have a communication interface that may be utilized to receive commands that operate the compiler 16. In an embodiment the compiler 16 may operate without the communication interface.

The analyzing module 52 analyzes the multithreaded application 18 to collect and summarize metadata. The multithreaded application 18 analyzes statements in the multithreaded application 18 by following the control and data dependencies in the multithreaded application 18 to identify and relate read accesses and write accesses to shared data storage 48. The analyzing module 52 collects or records metadata in the shared-data access metadata table 58 for each statement that accesses the shared data storage 48. The analyzing module 52 further summarizes the collected metadata by identifying producers and consumers. A producer is a statement in the multithreaded application 18 that writes data and a corresponding consumer is a statement in the multithreaded application 18 that reads the data written by the immediately preceding producer. Since a second time write to an access site that stores data is treated as a new producer, every shared-data has only one producer. Thus, summarizing is the process of identifying shared-data producer and consumer(s) where each producer consumer set has one producer and one or more consumers that access the shared-data.

The determining module 54 determines the proper optimizations for each metadata according to producer consumer sets identified from three cases described below and annotates the metadata with the appropriate optimization(s) type.

In the first case the determining module 54 determines that the shared-data producer and consumer are in the same thread 40. In this case the shared-data producer and consumer can be eliminated completely, because the information conveyed by the shared-data can be directly passed from the producer statement to the consumer statement in the multithreaded application 18 by an optimization that utilizes intra-procedural or inter-procedural copy propagation. In another embodiment the shared-data may be stored in local data storage 42 instead of shared data storage 48.

In the second case the determining module 54 determines that the shared-data producer and consumer(s) are in different threads 40 but those threads 40 run on the same core 32, 34, or 36. In this case, the shared-data can be promoted into the local data storage 42 from the shared data storage 48. In other words the local data storage 42 can be shared by all of the threads 40 running on the same processor 38.

In the third case the determining module 54 determines that the shared-data producer and consumer(s) are in different threads 40 running on different processors 38. In this case, the determining module 54 will not eliminate the shared-data accesses to shared data storage 48.

The optimizing module 56 reads the shared-data access metadata table 58 and optimizes the multithreaded application 18. The optimizing module 56 optimizes the multithreaded application 18 based on the optimization type in the shared-data access metadata table 58. The optimizing module 56 may optimize the multithreaded application 18 by inserting code, removing code, modifying code, etc. in the multithreaded application.

The insertion module 57 may optimize the multithreaded application 18 by extending the basic processing (e.g., processing by the analyzing module 52, determining module 54, and optimizing module 56) with three distinct extensions. The first and second extensions are collectively referred to as Spanning and the third extension is referred to as Partial Localization. Spanning and Partial localization result in the insertion module 57 extending the optimization by inserting producer(s) (e.g., write statements) into the multithreaded application 18 thus triggering the basic processing to identify new producer consumer dependencies in the multithreaded application 18 responsive to a second execution of the basic processing.

Spanning—First and Second Extension

The insertion module 57 identifies Spanning if some of the consumers are in the same thread 40 or run on the same processor 38 as the producer, and other consumers are in threads 40 that run on different processors 38.

In the first extension the insertion module 57 inserts a producer (e.g., write statement) that writes the shared-data to the shared data storage 48 just prior to leaving the processor 38. Execution of the basic processing now results in summarizing the producer and consumer(s) that execute in the control flow prior to the inserted producer as a new producer consumer set. The basic processing recognizes that the new producer consumer(s) share data in the same thread 40 and optimize accordingly. In addition, the basic processing also summarizes the inserted producer and all consumers after the inserted producer as new producer consumer set where shared-data are produced in one thread 40 and consumed in the thread 40 executing on a different processor 38 and, accordingly, does not optimize. Thus the insertion module 57 generates two producer consumer sets from one producer consumer set by inserting the producer.

In the second extension the insertion module 57 can still optimize consumers on the different processor 38 if there are more than two consumers on the one processor 38. That is, the insertion module 57 inserts a producer after the first consumer that loads the shared-data from the shared data storage 48, and the new producer moves the shared-data into local data storage 42. Application of the basic processing then adjusts the dependence of the rest of the consumers from the original producer on another processor 38 to the new producer on the same processor 38 and optimization is achieved.

Figure 4A:
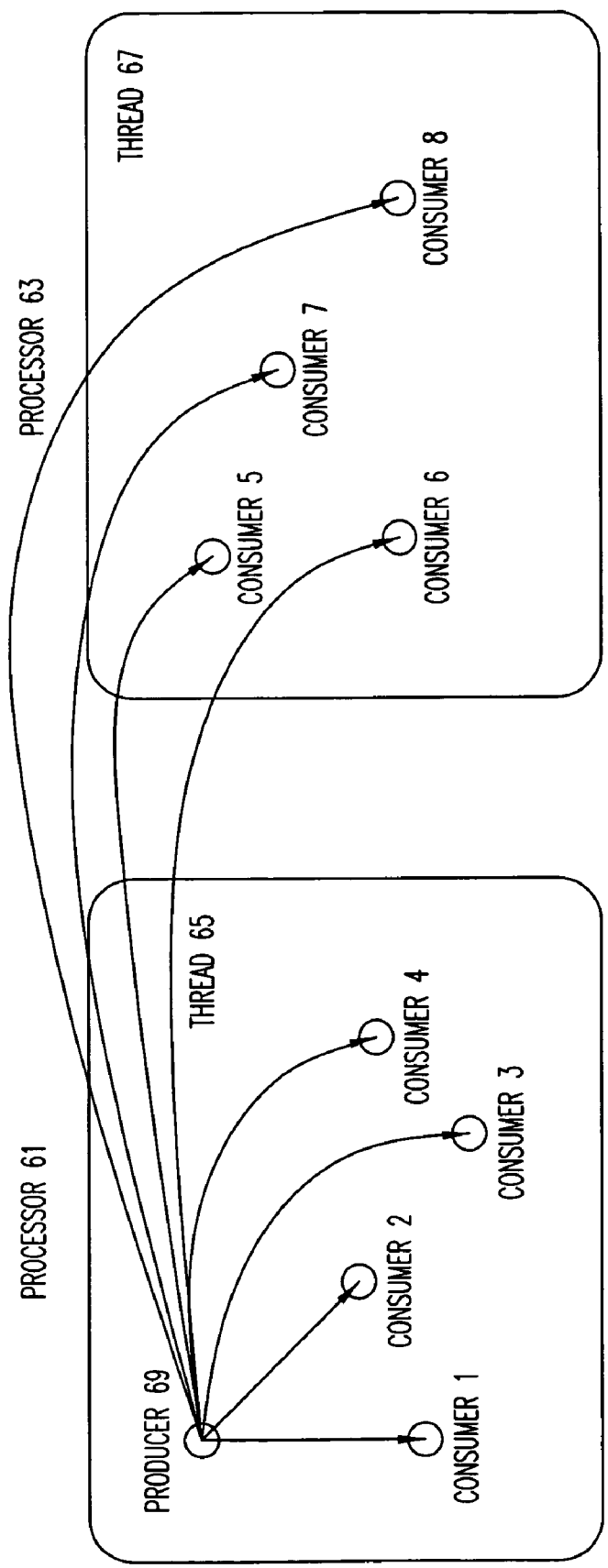
FIGS. 4A, 4B, 4C are block diagrams illustrating an optimization of multiple consumers spanning across multiple processing elements, according to an embodiment.

FIG. 4A is a block diagram illustrating original dependence before shared-data localization, according to an embodiment. The processor 61 is illustrated on the left and is shown to be running a thread 65 and the proccessor 63 is illustrated on the right and is shown to be running a thread 67. The processors 61 and 63 are emobdiments of the previously described processor 38 and the threads 65 and 67 are embodiments of the previously described thread 40. The threads 65 and 67 share data and the shared-data accesses are represented as circles. The shared-data access sequence order is represented by the number associated with each access (e.g., 1-8). The arrows between the circles are the data dependence relations between the producer and consumers. Specifically, the consumers are illustrated as dependent on a producer 69.

Figure 4B:
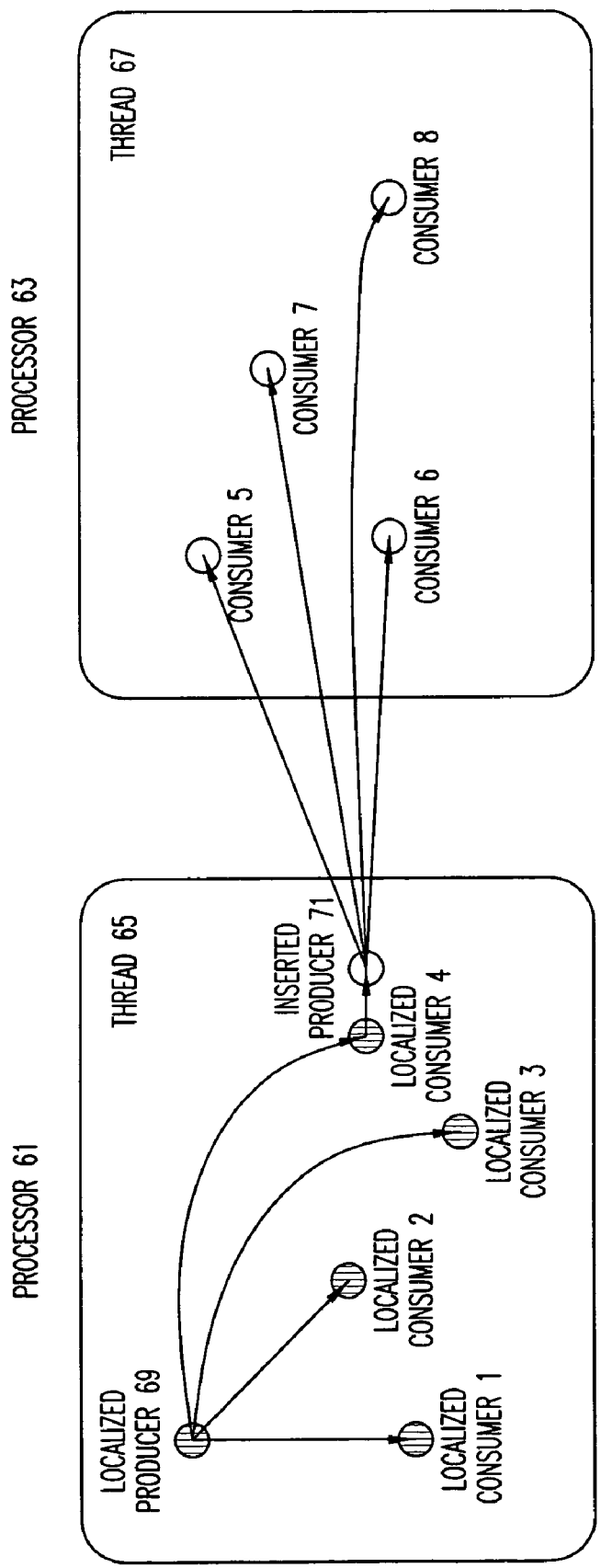

FIG. 4B is a block diagram illustrating the dependence relations after the optimization based on the first extension described above, according to an embodiment. Specifically, the insertion module 57 has inserted a producer 71 resulting in the localization of the shared-data accesses associated with the producer 69 in the processor 61. The barred circles indicate the accesses are optimized to access local data storage 42 and not shared data storage 48.

Figure 4C:
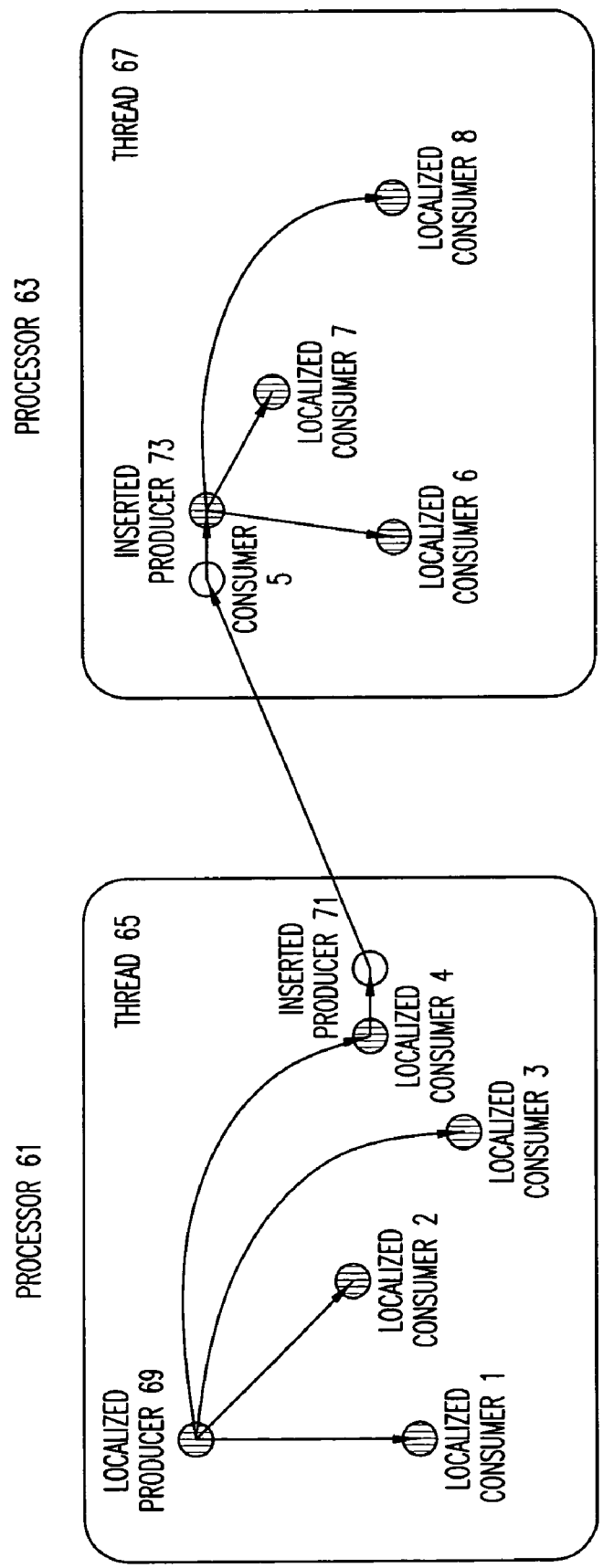

FIG. 4C is a block diagram illustrating both the first and second extensions, as described above, where the data accesses in both processors 61, 63 are optimized, according to an embodiment. As illustrated, the insertion module 57 inserts two additional shared-data accesses that are shown as the producer 71 and a producer 73. At the end of the optimization, there are two accesses still accessing shared data storage 48, compared to the original eight.

Partial Localization—Third Extension

The insertion module 57 identifies an opportunity for Partial Localization if the compiler 16 is restrained from analyzing all the source code of the multithreaded application 18 for shared-data localization. For example, when a part of the multithreaded application 18 is excluded from optimization (e.g., excluded part) because it is provided in binary library form or a non-critical path exists in the multithreaded application 18 (e.g., excluded part) and the compiler 16 is limited to examining only the critical paths then Partial Localization may be triggered. In these situations, the compiler 16 may optimize the shared-data accesses in the remainder of the multithreaded application 18. The insertion module 57 optimizes by inserting one or more producers (e.g., write access) before the data flow goes into or comes from the excluded part of the multithreaded application 18. The insertion module 57 inserts producer(s) that write to shared data storage 48 prior to entering the excluded part of the multithreaded application 18 because when a data flow goes into the excluded part of the multithreaded application 18 the compiler 16 does not know whether the excluded part of the multithreaded application 18 includes consumers that are dependent on producers in the non excluded part of the multithreaded application 18. In addition, the insertion module 57 inserts producer(s) that write to local data storage 42 when a data flow comes out of the excluded part of the multithreaded application 18 because the producer can reside in the excluded part of the multithreaded application 18, but the consumers still can be optimized with an inserted producer. Specifically, the consumers in the data flow coming out the excluded part of the multithreaded application 18 are optimized to access the local data storage 42.

Figure 5:
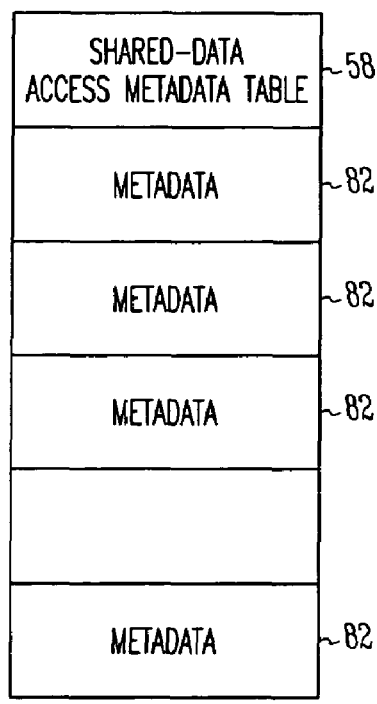
FIG. 5 is a block diagram illustrating a shared-data access metadata table, according to an embodiment.

FIG. 5 is a block diagram illustrating a shared-data access metadata table 58, according to an embodiment. The shared-data access metadata table 58 includes metadata 82 entries that correspond to statements (e.g., source code) in the multithreaded application 18. The shared-data access metadata table 58 is utilized by the analyzing module 52, the determining module 54, the optimizing module 56 and the insertion module 57 to optimize the multithreaded application 18.

Figure 6:
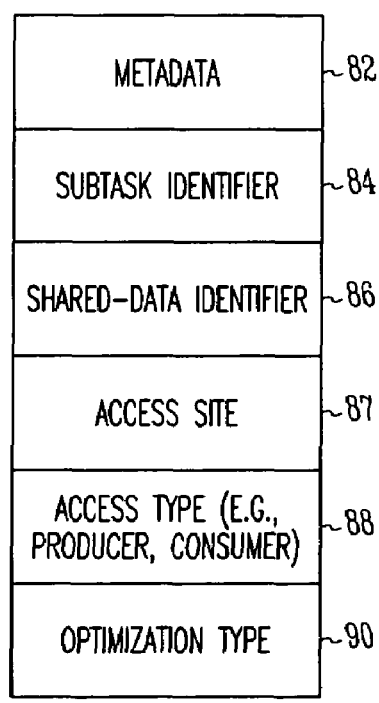
FIG. 6 is a block diagram illustrating metadata, according to an embodiment.

FIG. 6 is a block diagram illustrating the above described metadata 82, according to an embodiment. The metadata 82 corresponds to a write or read statement in the multithreaded application 18 source code and includes a subtask identifier 84, a shared data identifier 86, an access site 87, an access type 88 and an optimization type 90. The subtask identifier 84 associates the statement to the identified subtask in the multithreaded application 18. The shared data identifier 86 associates the statement to a particular consumer producer set. For example, the write access statement and one or more read access statements may be identified with the same shared data identifier 86 because the identified statements share data (e.g., a producer consumer set). The access site 87 identifies the statement accessing the identified site (e.g., a memory location). The access type 88 identifies the statement as a producer or consumer and the optimization type 90 identifies the type of optimization that may be performed by the optimization module for the associated statement (e.g., promote to local storage, intra-procedural copy propagation, inter-procedural copy propagation, etc.).

Figure 7:
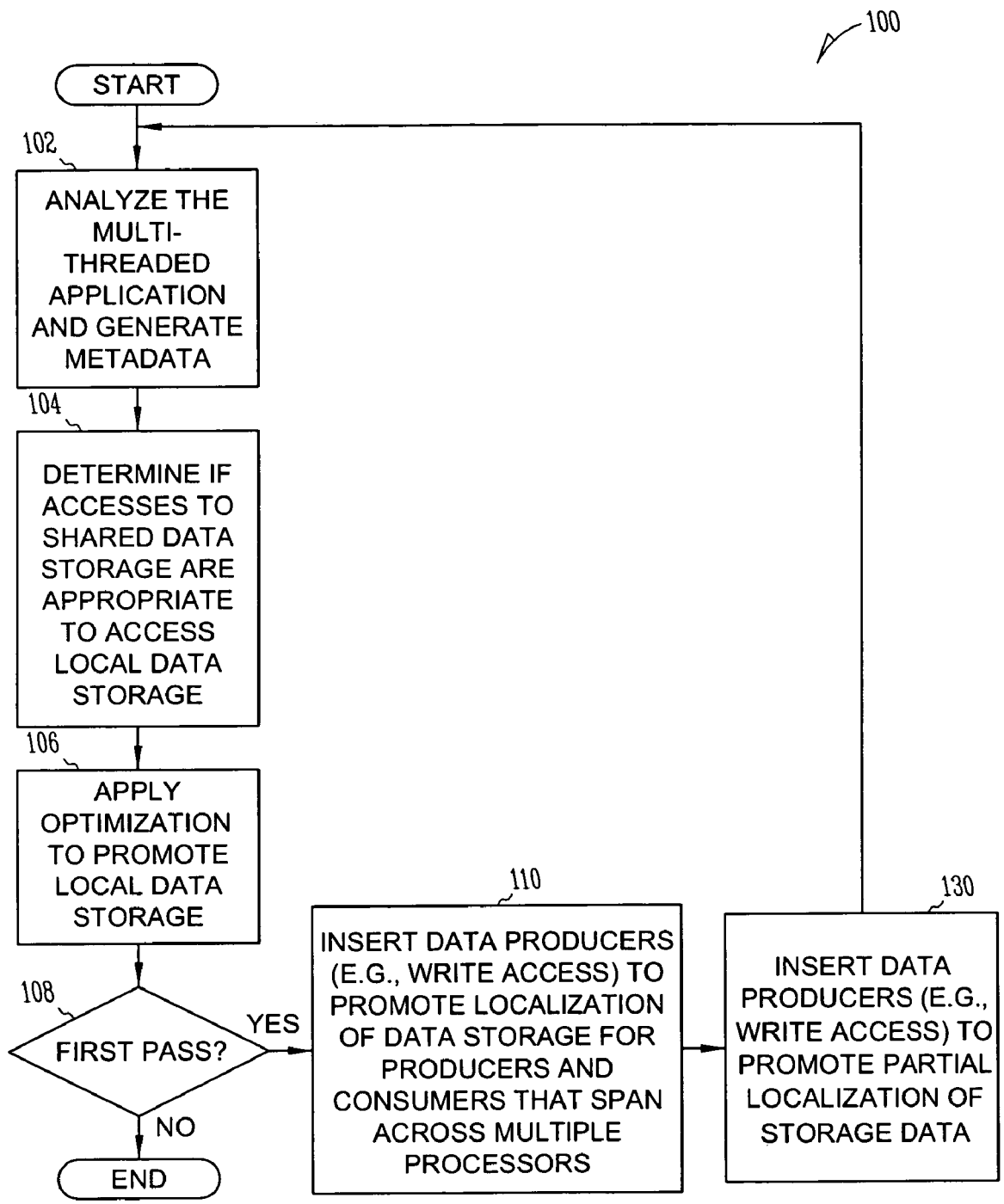
FIG. 7 is a block diagram illustrating a computer-implemented method, according to an embodiment, to reduce access to shared data storage.

FIG. 7 is a block diagram illustrating a computer-implemented method 100, according to an embodiment, to reduce access to shared data storage. The method 100 commences at operation 102 with the analyzing module 52 following the control flow in the multithreaded application 18 and collecting metadata. For each write statement that writes data to the shared data storage 48 and each read statement that reads data from the shared data storage 48 the analyzing module 52 stores metadata 82 in the shared-data access metadata table 58. For example, the analyzing module 52 stores the subtask identifier and the access site 87 associated to the statement in the multithreaded application 18. Next, the analyzing module 52 summarizes the metadata 82 by identifying producers and consumer sets (e.g., write statements and read statements that share data). The analyzing module 52 may identify one or more producer consumer sets by tracing the control flow in the multithreaded application 18 to identify statements that access the same access site 87 (e.g., memory location) and share data. The analyzing module 52 follows the control flow and identifies each write access as a producer and each read access that reads the data written by the previous producer as a related consumer (e.g., a producer consumer set). In other words because the read access reads the data written by the write access the read access and the write access may be said to share data. The analyzing module 52 registers this information (e.g., producer or consumer) in the access type 88 of the metadata 82 that corresponds and stores a the same shared data identifier 86 in the metadata 82 corresponding to the statements in a particular producer consumer set.

At operation 104, the determining module 54 determines if accesses to the shared data storage 48 by producer consumer sets may be promoted to localized storage and the proper optimization to achieve localized storage. If the determining module 54 identifies that the producer and consumer(s) of a particular set are in the same thread 40 then the determining module 54 may register an optimization type 90 indicating an intra procedural or an inter procedural copy propagation in the corresponding metadata 82. In another embodiment the determining module 54 may register an optimization type 90 indicating the utilization of local data storage 42.

If the determining module 54 identifies that the producer and consumer(s) of a particular set are in different threads 40, but those threads 40 run on the same processor 38, then the determining module 54 registers an optimization type 90 indicating the utilization of local data storage 42.

If the determining module 54 identifies that the producer and consumer(s) of a particular set are in different threads 40 then the determining module 54 registers an optimization type 90 indicating no optimization.

At operation 106, the optimizing module 56 applies optimizations to the multithreaded application based on the optimization type 90 in the metadata 82 in the shared-data access metadata table 58. The optimizing module 56 may apply an optimization by inserting, removing, modifying, etc. code in the multithreaded application 18.

At decision operation 108, the compiler 16 determines if it is executing the first pass through the multithreaded application 18. If this is the first pass then the compiler 16 branches to operation 110. Otherwise processing ends.

Figure 8:
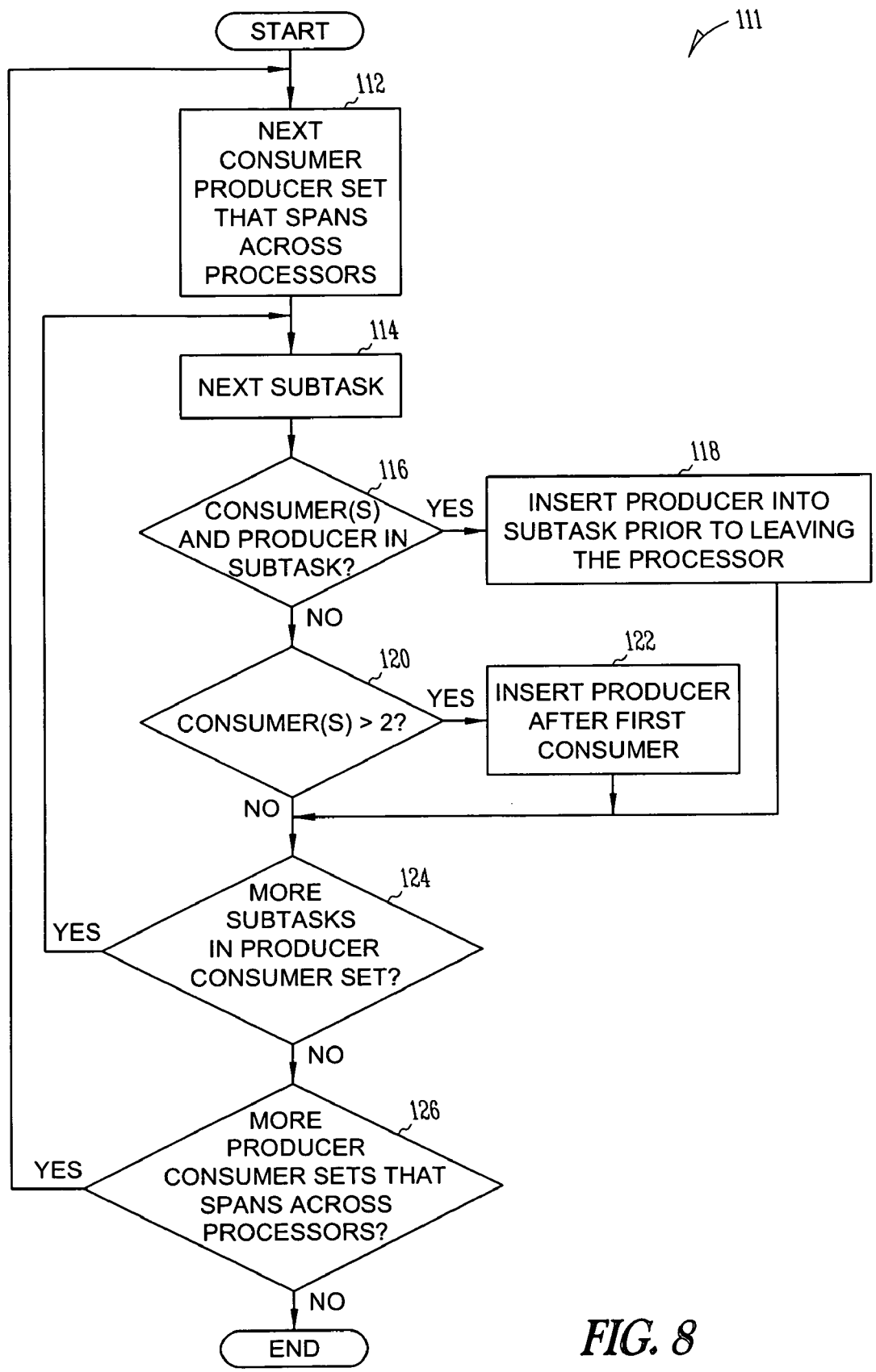
FIG. 8 is a block diagram illustrating a computer-implemented method, according to an embodiment, to optimize producer and consumers sets that span across processors.

At operation 110, the insertion module 57 optimizes producer consumer sets that span across processors. FIG. 8 is a block diagram illustrating a method 111, according to an embodiment, to optimize producer and consumer sets that span across processors. The method 111 commences at operation 112 with the insertion module 57 identifying a producer consumer set that spans across multiple processors 38 by reading the shared-data access metadata table 58. For example, producer consumer sets that span across processors 38 may be identified via the optimization type 90.

At operation 114, the insertion module 57 increments to the next subtask 22.

At decision operation 116, the insertion module 57 determines if a producer and at least one consumer are registered to the present subtask 22 based on the corresponding subtask identifiers 84. If the producer and at least one consumer are in the same subtask 22 then a branch is made to operation 118. Otherwise a branch is made to decision operation 120.

At operation 118 the insertion module 57 inserts a producer that writes to the shared data to shared data storage 48 just prior to the subtask 22 (e.g., thread 40) leaving the processor 38.

At decision operation 120 the insertion module 57 determines if more than two consumers are registered to the present subtask 22 based on the corresponding subtask identifiers 48. If more than two consumers are registered to the present subtask 22 then a branch is made to operation 122. Otherwise a branch is made to decision operation 124.

At operation 122 the insertion module 57 inserts a producer that writes to the data to local data storage 42 immediately after the first consumer in the subtask 22. In other words the first consumer reads the data from shared data storage 48 and the inserted producer writes the data to the local data storage 42 for the benefit of other consumers in the subtask 22 thereby enabling the other consumers to access the data from the local data storage 42.

At decision operation 126 the insertion module 57 determines if there are more producer consumer sets with producers and consumers that span processors 38. If there are producer consumer sets that span across processors 38 then the insertion module 57 branches to operation 112. Otherwise processing ends.

Returning to FIG. 7, at operation 130 the insertion module 57 promotes a partial localization of shared data by identifying parts of the multithreaded application 18 that have been excluded from optimization and inserting producers into appropriate locations in the multithreaded application 18 accordingly. The insertion module 57 inserts a producer that writes the shared data to shared data storage prior to entry into the part of the multithreaded application 18 that has been excluded from optimization. In addition, the insertion module 57 inserts a producer that writes the shared data to local data storage immediately after control has been passed from the excluded part of the multithreaded application 18 to the non excluded part of the multithreaded application 18. Finally, the insertion module 57 branches to begin basic processing again at operation 102. The second execution of the basic processing (e.g., operations 102, 104, 106, 108) promotes the localization of shared data into local data storage based on the newly inserted producers.

Figure 9:
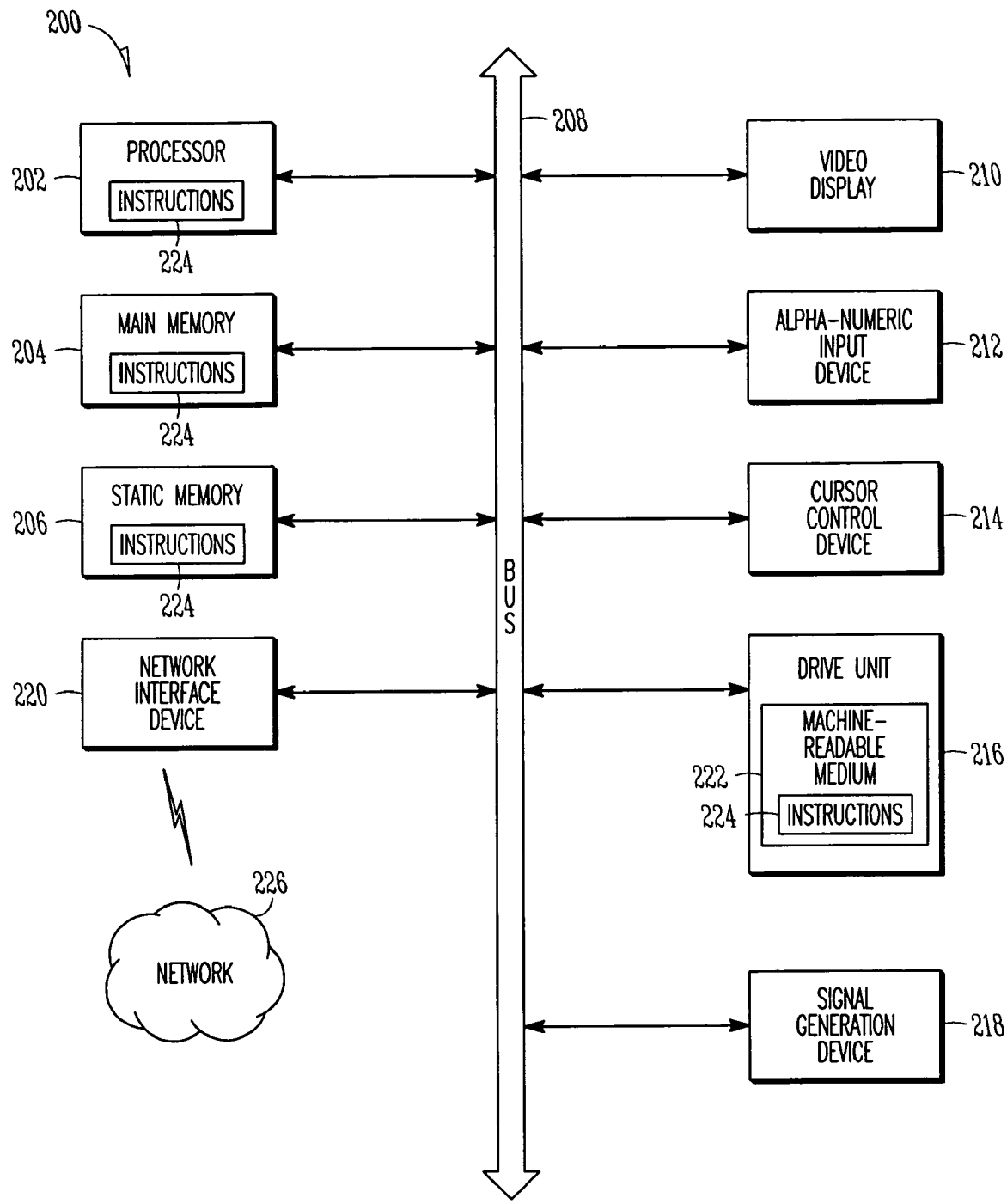
FIG. 9 is a block diagram of a machine, according to an embodiment, including instructions to perform any one or more of the methodologies described herein.

FIG. 9 shows a diagrammatic representation of machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary machine 200 includes a processor 202 (e.g., a central processing unit (CPU) a graphics processing unit (GPU) or both), a main memory 204 and a static memory 206, which communicate with each other via a bus 208. The machine 200 may further include a video display unit 210 (e.g., a liquid crystal display (LCD) or a cathode ray tube (CRT)). The machine 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the machine 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical media and magnetic media. The term "machine-readable medium" shall not include carrier wave signals.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A computer-implemented method to reduce access to a shared data storage, the computer-implemented method comprising:
    analyzing a multithreaded application to generate metadata associated with at least one access from the multithreaded application to the shared data storage;
    determining if the at least one access to the shared data storage is appropriate to access local data storage based on the metadata; and
    if so, applying an optimization to the multithreaded application, the application of the optimization to reduce access to the shared data storage from the multithreaded application when the multithreaded application executes on a plurality of processing elements.

2. The computer implemented method of claim 1, wherein the determining includes identifying if the at least one access includes a write access and a read access to the same access site and identifying if the read access reads the data written by the write access and identifying if the write access and the read access execute in the same thread on the same processing element.

3. The computer implemented method of claim 1, wherein the determining includes identifying if the at least one access includes a write access and a read access to the same access site, and identifying if the read access reads the data written by the write access, and identifying if the write access and the read access execute in different threads on the same processing element.

4. The computer implemented method of claim 1, further including inserting at least one write access into the multithreaded application to promote the utilization of local data storage in at least one processing element from the plurality of processing elements.

5. The computer implemented method of claim 1, further including inserting a first write access into the multithreaded application before entering an excluded part of the multithreaded application and inserting a second write access into the multithreaded application after exiting the excluded part of the multithreaded application.

6. The computer implemented method of claim 5, wherein the excluded part of the multithreaded application is at least one from a group of applications including a library application and non-critical path application.

7. The computer implemented method of claim 1, wherein the multithreaded application includes at least one from a group of multithreaded applications including a network multithreaded application and a streaming multithreaded application.

8. An apparatus to reduce access to a shared data storage, the apparatus comprising:
    at least one machine including:
    an analyzing module to analyze a multithreaded application to generate metadata associated with at least one access from the multithreaded application to the shared data storage;
    a determining module to determine if the at least one access to the shared data storage are appropriate to access local data storage based on the metadata; and
    an optimizing module apply an optimization into the multithreaded application, the application of the optimization to reduce access to the shared data storage from the multithreaded application when the multithreaded application is to execute on a plurality of processing elements.

9. The apparatus of claim 8, wherein the determining module identifies if the at least one access includes a write access and a read access to the same access site and identifying if the read access reads the data written by the write access and identifying if the write access and the read access execute in the same thread on the same processing element.

10. The apparatus of claim 8, wherein the determining module identifies if the at least one access includes a write access and a read access to the same access site and identifying if the read access reads the data written by the write access and identifying if the write access and the read access execute in different threads on the same processing element.

11. The apparatus of claim 8, wherein the insertion module inserts at least one write access into the multithreaded application to promote the utilization of local data storage in at least one processing element.

12. The apparatus of claim 8, wherein the insertion module identifies inserts a first write access into multithreaded application before entering an excluded part of the multithreaded application and inserts a second write access into the multithreaded application after exiting the excluded part of the multithreaded application.

13. The apparatus of claim 12, wherein the excluded part of the multithreaded application is at least one from a group of applications including a library application and non-critical path application.

14. The apparatus of claim 8, wherein the multithreaded application includes at least one from a group of multithreaded applications including a network multithreaded application and a streaming multithreaded application.

15. A system to reduce access to a shared data storage, the system comprising:
at least one machine including:
an analyzing module to analyze a multithreaded application to generate metadata associated with at least one access from the multithreaded application to the shared data storage;
a determining module to determine if the at least one access to the shared data storage is appropriate to access local data storage based on the metadata;
an optimizing module to apply an optimization to the multithreaded application, the application of the optimization to reduce access to the shared data storage from the multithreaded application when the multithreaded application executes on a plurality of processing elements; and
a communication interface to receive commands to operate the system.

16. The system of claim 15, further including an insertion module to insert a write access to the local data storage to reduce read access from the shared data storage.

17. The system of claim 16, wherein the insertion module is to determine if a subtask includes at least two read accesses from the shared data storage before the insertion module is to insert the write access into the subtask.

18. A tangible machine readable medium storing a set of instructions that, when executed by a machine, cause the machine to:
analyze a multithreaded application to generate metadata associated with at least one access from the multithreaded application to the shared data storage;
determine if the at least one access to the shared data storage is appropriate to access local data storage based on the metadata; and
apply an optimization to the multithreaded application, the application of the optimization to reduce access to the shared data storage from the multithreaded application when the multithreaded application executes on a plurality of processing elements.

19. The tangible machine readable medium of claim 18, wherein the local data storage includes any one from a group including a register and local memory.

20. The tangible machine readable medium of claim 18, wherein the shared data storage includes any one from a group including scratch pad memory, dynamic ram, and static ram.

* * * * *